United States Patent [19]

Zorn et al.

[11] 4,056,337
[45] Nov. 1, 1977

[54] EXTERNAL GEAR TYPE FLUID DISPLACING MACHINE WITH BEARING GAP

[75] Inventors: Jürgen Zorn, Korntal; Jan Vlemmings, Hemmingen; Karl-Heinz Müller, Gerlingen; Siegfried Mayer, Vaihingen, Enz; Wilhelm Dworak, Stuttgart; Eugen Hartmann, Hausen; Martin Fader, Bieselsberg; Wolfgang Talmon, Otisheim; Claus Jöns, Munchingen; Ivan Sauer, Schwieberdingen; Paul Bosch, Ludwigsburg, all of Germany

[73] Assignee: Robert Bosch GmbH, Stuttgart, Germany

[21] Appl. No.: 596,738

[22] Filed: July 17, 1975

[30] Foreign Application Priority Data

Aug. 10, 1974 Germany .......................... 2438512

[51] Int. Cl.² .................... F01C 19/08; F03C 3/00; F04C 15/00
[52] U.S. Cl. ................................................ 418/131
[58] Field of Search ............... 418/131, 132, 205, 206, 418/135

[56] References Cited

U.S. PATENT DOCUMENTS

| 3,003,425 | 10/1961 | Flowers | 418/135 |
| 3,270,680 | 9/1966 | Rich | 418/206 |
| 3,309,997 | 3/1967 | Kita | 418/206 |
| 3,481,275 | 12/1969 | Gelin | 418/206 |
| 3,528,756 | 9/1970 | Norlin et al. | 418/135 |
| 3,574,492 | 4/1971 | Schwary | 418/206 |

FOREIGN PATENT DOCUMENTS

| 1,553,125 | 4/1970 | Germany | 418/206 |

Primary Examiner—John J. Vrablik
Attorney, Agent, or Firm—Michael J. Striker

[57] ABSTRACT

An external gear type hydraulic pump or motor wherein the trunnions of gears in the chamber of the housing are surrounded by annular bearing members. The peripheral surface of each bearing member defines with the adjacent internal surface of the housing an arcuate gap whose width increases in a direction toward the respective end face of the corresponding gear. To this end, portions of or the entire peripheral surfaces of bearing members and/or portions of or the entire internal surfaces of the housing have a conical or spherical shape. The gaps are located in the low-pressure zone and reduce the likelihood of wear upon those end faces of bearing members which are adjacent to the end faces of the gears because the bearing members can tilt in response to increasing load without localized rubbing against the gears. Additional gaps can be provided between the end faces of the gears and the adjacent end faces of the bearing members to further reduce the likelihood of uneven wear upon the bearing members.

13 Claims, 9 Drawing Figures

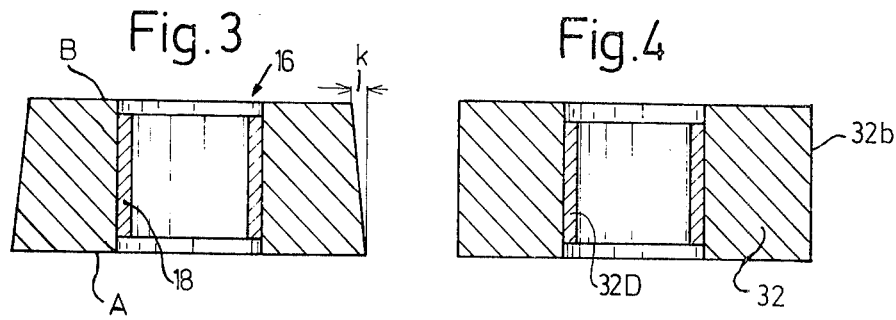
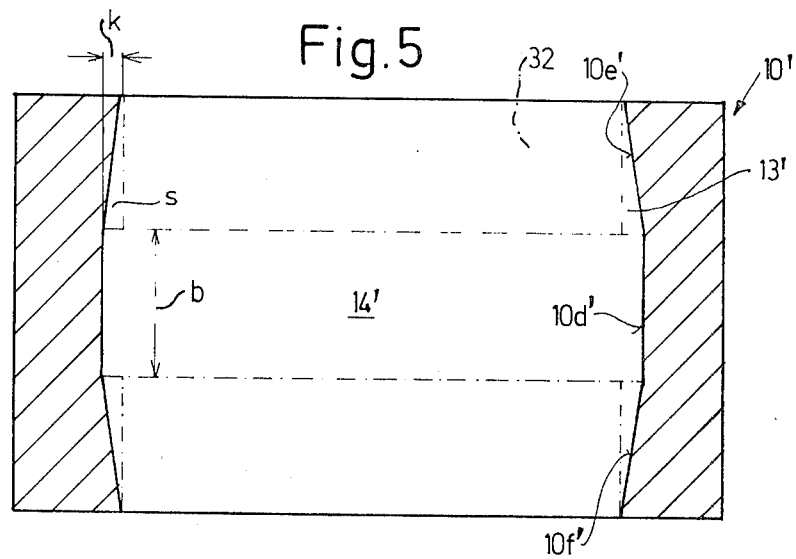
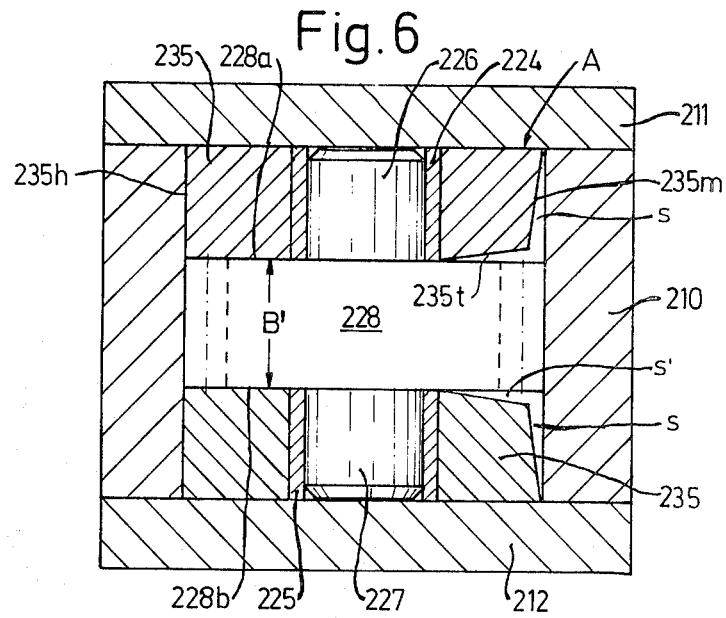

EXTERNAL GEAR TYPE FLUID DISPLACING MACHINE WITH BEARING GAP

BACKGROUND OF THE INVENTION

The present invention relates to external gear type fluid displacing machines, especially to external gear type hydraulic pumps or motors, and more particularly to improvements in the construction of housing and bearing members for the trunnions of spur, helical or herringbone gears in such machines.

In presently known external gear type pumps or motors (hereinafter referred to as pumps for convenience), the bearings members which surround the trunnions of gears have circular cylindrical peripheral surfaces and the housing or body of the pump has circular cylindrical internal surfaces which are immediately adjacent to the peripheral surfaces of the bearing members. It has been found that such bearing members are subjected to excessive wear which is most pronounced in the low-pressure region (i.e., in the case of a pump in the region adjacent to the inlet port). The end faces of the gears rub against the adjacent end faces of the bearing members and cause the latter to wear away after relatively short periods of use. The reason for such excessive wear upon the end faces of bearing members in immediate proximity to the gears is that the bearing members undergo a pronounced deformation when the load thereupon increases, i.e., when the gear teeth convey fluid from the inlet port toward the outlet port. The deformation is readily detectable in the low-pressure area and results in radial upsetting of bearing members. Such upsetting, in turn, results in arching of those portions of the end faces of bearing members which are adjacent to the respective end faces of associated gears at the low-pressure side of the pump. The wear progresses until each end face of each gear is in full surface-to-surface contact with the adjacent end face of the respective bearing member. The arching of the end faces of bearing members in the low-pressure area is enhanced by end pressure which develops as a result of more or less pronounced flexing of trunnions under load. It has been found that the useful life of bearing members having circular cylindrical peripheral surfaces and being surrounded by circular cylindrical internal surfaces of the pump body is extremely short so that such bearing members must be inspected and replaced at frequent intervals. Defective bearing members affect the output of the pump and are likely to cause damage to or destruction of other pump components.

SUMMARY OF THE INVENTION

An object of the invention is to provide an external gear type fluid displacing machine wherein the likelihood of uneven and/or rapid wear upon the bearing members for the trunnions of gears is much less pronounced than in heretofore known external gear type machines.

Another object of the invention is to provide novel and improved bearing members for the trunnions of external type gears in hydraulic pumps or motors.

A further object of the invention is to provide a novel and improved housing or body for use in external gear type hydraulic pumps or motors.

An additional object of the invention to construct and assemble an external gear type pump or motor in such a way that the wear upon those end faces of bearing members which are adjacent to the end faces of the respective gears is a small fraction of wear upon the bearing members in conventional pumps or motors.

A further object of the invention is to provide a gear pump or motor with bearing members which insure that the distribution of stresses which are transmitted by trunnions (either directly to the bearing members or to bearing sleeves which are inserted into and can be said to constitute component parts of bearing members) improves proportionally or substantially proportionally with increasing magnitude of such stresses.

The invention is embodied in an external gear type fluid displacing machine which can be used as a pump or motor and comprises a housing or body having a chamber which is preferably eight-shaped, a pair of mating gears mounting in the chamber and each having at least one trunnion or shaft and an end face adjacent to the respective trunnion, and annular bearing members which surround the trunnions and have conical, spherical and/or circular cylindrical peripheral surfaces. The housing has conical, circular cylindrical and/or spherical internal surfaces which define with the peripheral surfaces arcuate gaps whose cross-sectional area or width increases in directions toward the respective gears.

The housing has a fluid-admitting first port and a fluid discharging second port, and the chamber includes a portion or zone which is adjacent to one of the ports and wherein the pressure of fluid is relatively low when the gears rotate and the first port admits fluid into the chamber. The low pressure zone is adjacent to the inlet port if the machine is used as a pump and to the outlet port if the machine is used as a motor. At least a portion of each gap forms part of the low-pressure portion or zone of the chamber.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an axial sectional view of a bearing member and of its sleeve, substantially as seen in the direction of arrows from the line III—III of FIG. 1;

FIG. 4 is a similar axial sectional view of a second bearing member;

FIG. 5 is a sectional view of a portion of a housing forming part of a machine which utilizes bearing members of the type shown in FIG. 4;

FIG. 6 is a sectional view of a third machine with bearing members which constitute modifications of bearing members shown in FIGS. 3 and 4;

DESCRIPTION OF THE PREFERRED EMBODIMENTS

Figure 1:
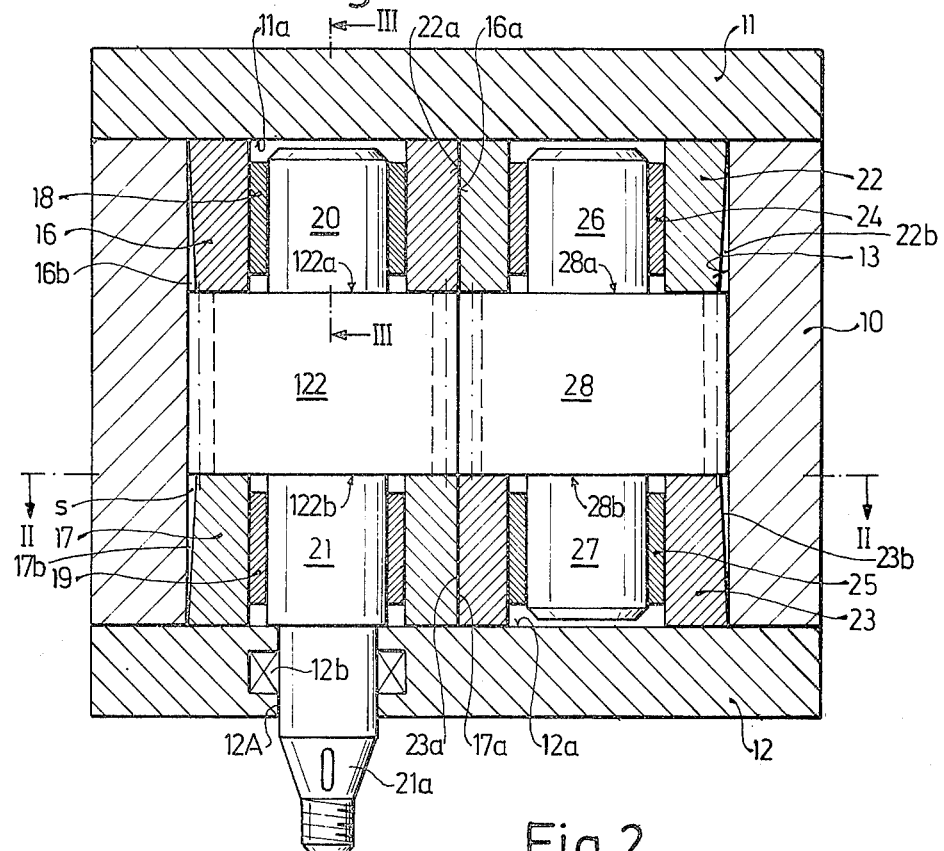
FIG. 1 is a central longitudinal sectional view of an external gear type machine which embodies one form of the invention.
Figure 2:
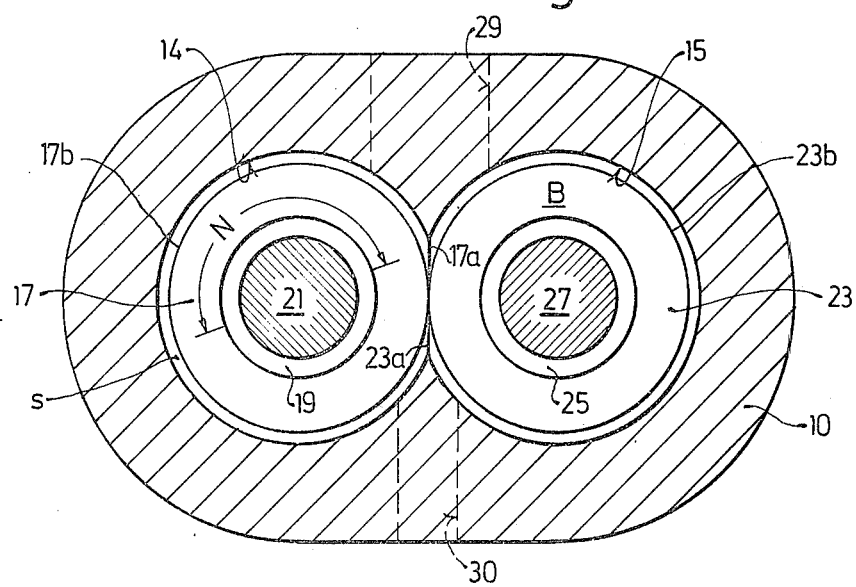
FIG. 2 is a sectional view as seen in the direction of arrows from the line II—II of FIG. 1.

The external gear type pump of FIGS. 1 and 2 has a housing or body which comprises a main or central section 10 and two outer sections or covers 11, 12. The outer sections 11, 12 are bolted to the main section 10 and seal the ends of an eight-shaped chamber 13 consisting of two partially overlapping parallel cylindrical bores 14, 15 which are machined into the main section.

The bore 14 of the chamber 13 receives two coaxial annular bearing members 16, 17 for the trunnions 20, 21 of a driver gear 122, e.g., a spur gear. Similar coaxial annular bearing members 22, 23 are installed in the bores 15 and respectively surround the trunnions 26, 27 of a driven spur gear 28 which meshes with the gear 122. The trunnions 20, 21, 26, 27 are respectively surrounded by cylindrical sleeves 18, 19, 24, 25 each of which is a press-fit in the respective bearing member 16, 17, 22, 23. The trunnion 21 has an extension 21a which passes through an opening 12A of the section 12 and is surrounded by a sealing element 12B. The exposed end of the extension 21a can be coupled to a prime mover, not shown. The bearing members 16, 22 and 17, 23 are respectively formed with abutting flats 16a, 22a and 17a, 23a so that they cannot rotate in the housing 10–12. The main section 10 has a fluid-admitting inlet port 29 at one side of the region where the teeth of the gears 122, 28 mesh and a fluid-discharging outlet port 30 at the other side of such region.

The surfaces surrounding the bores 14, 15 in the main section 10 of the pump housing are circular cylindrical surfaces. The external surfaces 16b, 17b, 22b, 23b of the respective bearing members 16, 17, 22, 23 are conical surfaces which taper in directions from the inner sides 11a, 12a of the respective outer sections 11, 12 toward the respective end faces 122a, 122b, 28a, 28b of the gears 122, 28. These conical surfaces define with the respective circular cylindrical surfaces four arcuate gaps $s$ whose cross-sectional area increases in directions from the outer sections 11, 12 toward the respective gears 122, 28. The conicity $k$ (FIG. 3) of surfaces 16b, 17b, 22b, 23b is exaggerated in FIGS. 1 to 3 for the sake of clarity. For example, the conicity $k$ may be in the range of 1–3 hundredths of 1 millimeter for each centimeter of the respective bearing member, as considered in the axial direction of the respective gear. The smaller end faces B of the bearing members 16, 17, 22, 23 (see the bearing member 16 in FIG. 3) are adjacent to the respective end faces of the gears 122, 28, and the larger-diameter end faces A of the bearing members (see the end face A of the bearing member 16 in FIG. 3) are adjacent to the inner sides of the respective outer housing sections.

Figure 7:
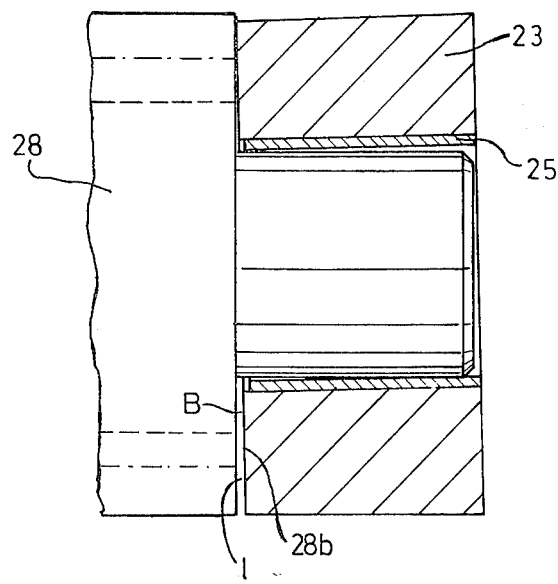
FIG. 7 is an enlarged view of a detail in FIG. 1 but showing a bearing member with a slightly different sleeve.

When the pump is in use, the bearing members are tilted in the respective bores 14, 15 of the chamber 13 (see FIG. 7 which shows the gear 28, the bearing member 23 and a slightly modified sleeve 25"). The just mentioned tilting results in the formation of arcuate clearances between the end faces B and the adjacent end faces of the gears (see the clearance $l$ between the end face 28b of gear 28 and the smaller-diameter end face B of bearing member 23 shown in FIG. 7). the clearances $l$ develop primarily in the low-pressure areas or zones one of which is indicated (at N) in FIG. 2. Such low-pressure areas form part of the chamber 13 and extend from the inlet port 29, circumferentially of the gears 122, 28 and toward but short of the outlet port 30. The transmission of loads from trunnions 20, 21, 26, 27 to the bearing members 16, 17, 22, 23 takes place first close to the larger-diameter end faces A of the bearing members (i.e., close to the inner sides 11a, 12a of the respective outer housing sections). As the load increases, it is being propagated toward the respective end faces of the corresponding gears. Such increasing load is taken up first in the low-pressure zones N (i.e., close to the inlet port 29). Thus, as the load upon the bearing members 16, 17, 22, 23 increases, it becomes more evenly distributed in the axial direction of the bearing members; in fact, when the load reaches a certain maximum or relatively high value, the trunnions and sleeves transmit stresses to the respective bearing members all the way from the larger-diameter end faces A to the smaller-diameter end faces B. This is in contrast to operation of conventional pumps wherein the major percentage of stresses is concentrated at the inner ends of the bearing members, i.e., close to the end faces of the respective gears. The just described design of and progress of transmission of stresses to the bearing members brings about not only a very pronounced decrease or complete elimination of wear upon the end faces A and B but also a much more uniform distribution of stresses to the bearing members and sleeves, as considered in the axial direction of bores 14 and 15. Such stresses are transmitted by the trunnions 20, 21, 26 and 27.

The bearing member 16 can be made integral with the bearing member 22 and/or the bearing member 17 can be made integral with bearing member 23.

Similar results can be achieved by resorting to annular bearing members (see the bearing member 32 in FIG. 4) having circular cylindrical peripheral surfaces 32b (save for the aforementioned flats) which are inserted into bores machined into the main housing section 10' (FIG. 5) and are bounded, at least in part, by conical internal surfaces. The bores form part of a chamber 13'. The bores 14' of FIG. 5 has a median portion bounded by a circular cylindrical surface 10d' and two outer portions bounded by conical surfaces 10e', 10f'. The portions which are bounded by conical surfaces 10e', 10f' receive bearing members 32 (each of which contains a sleeve 32D) and the axial length ($b$) of the surface 10d' equals or approximates the axial length of a gear. The surfaces 10e' 10f' taper in directions toward the adjacent ends of the bore 14', i.e., toward the respective outer sections (not shown in FIG. 5) of the housing which includes the section 10'. The conicity $k$ of gaps $s$ which develop when each of the surfaces 10e' 10f' surrounds a discrete bearing member 32 can be selected in the same way as described in connection with FIGS. 1 and 2. The manner in which the distribution of stresses upon the bearing members 32 and their sleeves 32D progresses (when the forces which the trunnions transmit to the respective sleeves 32D increase) is the same as described above in connection with the bearing members 16, 17, 22 and 23.

Figure 8:
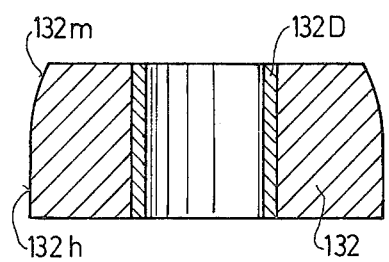
FIG. 8 is an axial sectional view of a further bearing member.

It is clear that the features of the pumps shown in FIGS. 1–2 and 4–5 can be embodied in a single pump. Thus, the main section of the pump may have bores which are bounded in part by conical internal surfaces surrounding bearing members with conical peripheral surfaces. All that counts is to insure that, when the pump is assembled, there develops a conical gap $s$ between the peripheral surface of each bearing member and the adjacent internal surface of the main housing section, and that the cross-sectional area of each gap increases in a direction toward the respective gear. Moreover, it is not necessary that the gaps be defined by conical and circular cylindrical surfaces or by pairs of conical surfaces, i.e., the configuration of surfaces which bound the gaps may be more complex and the gaps need not extend all the way from the end faces of the gears to the inner sides of the respective outer housing sections. FIG. 8 shows a bearing member 132 having a partly circular cylindrical and partly convex or spherical peripheral surface (as at 132h and 132m). Such configuration, together with circular cylindrical configuration of the internal surface of the main housing section, also insures that the width of each gap increases in a direction toward the respective gear. FIG. 8 further shows a sleeve 132D in the bearing member 132. The portions 132h and 132m can respectively surround the outer and inner halves of the bearing member 132, namely the halves which are respectively remote from and nearer to the gear.

As mentioned above, the gaps s need not extend circumferentially around the entire bearing members; in fact, a gap need not even extend from the one to the other end of the respective flat on a bearing member. It is most important to make sure that the gaps extend along the full length of the low-pressure zones N, as considered in the circumferential direction of the bearing members from the inlet port toward the outlet port. The length of a gap s can even be reduced to a fraction of the length of the zone N shown in FIG. 2, as long as there is a gap close to the inlet port. A gap can be formed by starting with a bearing member having a circular cylindrical peripheral surface (such as the surface 32b of the bearing member 32 shown in FIG. 4) and by thereupon removing some material from that portion of the peripheral surface which is to be placed close to the inlet port. The removal of some material may result in the formation of an arcuate gap which extends all the way from the one to the other end face of the bearing member or a gap which extends from a median portion and to that end face of the bearing member which is adjacent to the gear. The width of the gap can increase linearly (as shown in FIGS. 1, 3 and 5) or at a more complex rate when the bearing member or the main housing section is formed with a convex or concave (spherical) external or internal surface.

Figure 9:
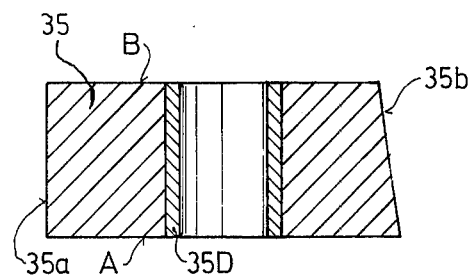
FIG. 9 is a similar sectional view of still another bearing member.

FIG. 9 shows a bearing member 35 surrounding a sleeve 35D and having a peripheral surface 35b provided with a flat 35a. The outline of the major portion of the surface 35b is not a straight line, i.e., such surface is not a true cone; instead, the outline exhibits a slight concavity so that the width of the gap which is defined with a circular cylindrical internal surface of the main housing section (not shown in FIG. 9) increases at a complex rate in a direction from the outer end face A toward the inner end face B of the bearing member.

FIG. 6 shows a portion of a further pump with housing sections 210, 211, 212, sleeves 224, 225, trunnions 226, 227 and gear 228. The gear 228 meshes with a second gear (not shown in FIG. 9) corresponding to the gear 128 of FIG. 1. The bearing members 235 have flats (not shown) which abut against similar flats of the other two bearing members, peripheral surfaces which include circular cylindrical portions 235h remote from the low-pressure zone and conical portions 235m adjacent to the low pressure zone, larger-diameter end faces A adjacent to the inner sides of the respective outer housing sections 211, 212, and inner end faces B' each of which includes a portion which is normal to the axis of the gear 268 and a portion 235t which tapers away from the adjacent end face 228a or 228b of the gear 228. Thus, the end faces 228a, 228b and the portions 235t define second gaps s' which are disposed in the low-pressure zone and whose width increases radially outwardly, i.e., toward the internal surface of the main housing section 210. The second gaps s' are optional but desirable; they further reduce the likelihood of wear upon the end faces B' and 228a, 228b when the bearing members 235 are tilted while the pump is in use. The reason for desiring the gaps s' is that flexing of the trunnions 226, 227 causes slight compression of the members 235 at one side, so that at the diametrically opposite side they become slightly elongated. This elongation is compensated for by the presence of gaps s'.

When the improved machine is used as a motor, that portion of the chamber in the housing or body which constitutes the low-pressure zone is adjacent to the outlet port.

The sections of the housing preferably consist of an aluminum alloy, the bearing members of a die-cast aluminum alloy, the sleeves of steel, bronze or Teflon (trademark), and the gears and trunnions of case-hardened steel.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an external gear type fluid displacing machine, a combination comprising a housing having a chamber; a pair of mating gears in said chamber, each of said gears having at least one trunnion and a first end face adjacent to said trunnion; and annular bearing members surrounding said trunnions and each having a second end face opposite one of said first end faces extending in the radial direction at least over a substantial portion of the radial extent of said first end face and also having an outer peripheral surface, said housing having internal surfaces adjacent to and defining with the outer peripheral surfaces of the bearing members, when the machine is not in operation, arcuate gaps extending at least over a major portion of the length of said bearing members and having cross-sectional areas gradually increasing toward the end faces of the respective gears, said bearing members being in operation subject to tilting with resulting radial upsetting and axial elongation of the bearing members, said tilting causing formation of axial clearances between said first and second end faces which compensate for said axial elongation and at least reduce frictional wear between said first and second end faces.

2. A combination as defined in claim 1, wherein said internal surfaces of said housing are cylindrical surfaces, and wherein said annular bearing members and adjacent trunnions have flat surface portions engaging each other and extending parallel to the axis of said trunnions whereas the remainder of the outer peripheral surfaces of said bearing members are conical surfaces tapering toward said end faces of said gears to form with said cylindrical surfaces of the housing said gaps.

3. A combination as defined in claim 2, and including a sleeve sandwiched between the outer surface of each trunnion and the inner surface of each bearing member, said sleeve engaging, when the machine is not in operation, over its whole length, the outer surface of the respective trunnion and the inner surface of the respective bearing member.

4. A combination as defined in claim 1, wherein said housing has a fluid-admitting first port and a fluid-discharging second port, said chamber including a portion which is adjacent to one of said ports and wherein the pressure of fluid is relatively low when said gears rotate and said first port admits fluid into said chamber, at least a portion of each of said gaps forming part of said portion of said chamber.

5. A combination as defined in claim 4, wherein at least a portion of each of said outer peripheral surfaces is a spherical surface.

6. A combination as defined in claim 4, wherein said internal surfaces are circular cylindrical surfaces and at least a portion of each of said outer peripheral surfaces is a conical surface.

7. A combination as defined in claim 4, wherein the width of said gaps increases at the rate of 1-3 hundredths of 1 millimeter for each centimeter of the respective trunnion, as considered in the axial direction of said gears.

8. A combination as defined in claim 4, wherein each of said annular members is a discrete ring-shaped body.

9. A combination as defined in claim 4, wherein at least one of said surfaces is a conical surface.

10. A combination as defined in claim 9, wherein said outer peripheral surfacs are conical surfaces.

11. A combination as defined in claim 9, wherein said internal surfaces are conical surfaces.

12. A combination as defined in claim 4, wherein said clearance is located, at least in part, in said portion of said chamber.

13. A combination as defined in claim 12, wherein the first end faces of said gears are normal to the axes of the respective gears and the second end face of each of said bearing members has a first portion which is parallel to the first end face of the respective gear and a second portion which is inclined with respect to the first end face of the respective gear, each of said clearances being bounded in part by the second portion of the end face of the respective bearing member and its width increasing in a direction radially outwardly of the respective gear.

* * * * *